US007340550B2

(12) United States Patent
Derr et al.

(10) Patent No.: US 7,340,550 B2
(45) Date of Patent: Mar. 4, 2008

(54) USB SCHEDULE PREFETCHER FOR LOW POWER

(75) Inventors: Michael N. Derr, El Dorado Hills, CA (US); John Howard, Portland, OR (US); Darren Abramson, Folsom, CA (US); Leslie E. Cline, Sunnyvale, CA (US); Rob Strong, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 11/004,011

(22) Filed: Dec. 2, 2004

(65) Prior Publication Data

US 2006/0123180 A1 Jun. 8, 2006

(51) Int. Cl.
*G06F 13/36* (2006.01)
*G06F 1/00* (2006.01)

(52) U.S. Cl. .............. 710/308; 710/313; 713/330
(58) Field of Classification Search .............. 710/22, 710/23, 28, 34, 110, 305, 308, 313; 713/300, 713/320, 323, 330
See application file for complete search history.

(56) References Cited

U.S. PATENT DOCUMENTS

| 5,933,611 | A  | * | 8/1999 | Shakkarwar | 710/100 |
| 6,324,597 | B2 | * | 11/2001 | Collier | 710/22 |
| 6,721,815 | B1 | * | 4/2004 | Leete | 710/6 |
| 6,792,495 | B1 | * | 9/2004 | Garney et al. | 710/305 |
| 6,990,550 | B2 | * | 1/2006 | Hesse et al. | 710/313 |
| 2002/0104030 | A1 | * | 8/2002 | Ahn | 713/310 |
| 2002/0144037 | A1 | * | 10/2002 | Bennett et al. | 710/105 |
| 2002/0178310 | A1 | * | 11/2002 | Nozaki | 710/240 |
| 2004/0017772 | A1 | * | 1/2004 | Saito et al. | 370/229 |
| 2005/0010702 | A1 | * | 1/2005 | Saito et al. | 710/52 |
| 2005/0033869 | A1 | * | 2/2005 | Cline | 710/8 |

OTHER PUBLICATIONS

Universal Host Controller Interface (UHCI) Design Guide, Rev. 1.1, Intel, Mar. 1996.*
Enhanced Host Controller Interface Specification for Universal Serial Bus, Rev. 1.0, Intel, Mar. 12, 2002.*
Power Saving of Using USB Selective Suspend Support Whitepaper, Intel Mobile Platform Group, Nov. 2002.*
USB FAQ: Introductory Level, Microsoft Corporation, Jul. 9, 2004.*
Definition of Dynamic Random Access Memory from Wikipedia.*
Definition of Dynamic Random Access Memory from Wikipedia, undated.*

* cited by examiner

*Primary Examiner*—Khanh Dang
(74) *Attorney, Agent, or Firm*—David P. McAbee

(57) ABSTRACT

A circuit for monitoring future Universal Serial Bus (USB) activities is described. Specifically, the circuit may comprise a Direct Memory Access (DMA) engine schedule prefetcher. The DMA engine schedule prefetcher accesses linked list schedule structures in main memory. The structures are checked for future frames where the linked list has USB activity scheduled. A periodic DMA engine subsequently accesses main memory only during frames where USB traffic is scheduled.

26 Claims, 5 Drawing Sheets

USB SCHEDULE PREFETCHER FOR LOW POWER

FIELD

The present invention pertains to the field of computer system design. More particularly, the present invention relates to a USB schedule prefetcher that allows a processor to enter a power-saving mode during periods when no USB activities are scheduled.

BACKGROUND

A computer system may be equipped with a Universal Serial Bus (USB). USB ports allow USB-enabled devices to connect and communicate with the computer system. Examples of electronic devices that communicate with computer systems through USB ports include digital cameras, keyboards, hard drives, and printers.

A USB host is in charge of the USB bus in a computer system. The USB host is a collection of software and hardware inside the computer system that supports the USB bus. The USB host is typically responsible for identifying devices that are connected to a USB port. The USB host may then load any needed device drivers dynamically. Finally, the USB host may periodically poll each of the attached devices for data communications.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

USB data may be delivered isochronously. Software usually schedules a USB periodic list to communicate data transfer and interrupt information to a USB host controller. Such a periodic linked list schedule structure may be stored in the main memory of a computer system.

The USB host controller may be located in a chipset/controller hub. USB data may be transferred in approximately 125 microsecond-granular frames. However, the granularity of the frames is not so limited. As an exemplary range, frames may have a temporal length of 75 to 175 microseconds. The USB host controller may access the linked list structure directly from main memory. However, continuous access of main memory may require continuous snooping of a processor's cache. As a result, the processor may be prevented from being placed in a low power mode.

A processor is in the "C0" state if the processor is operating at full power. The processor is in the "C1" state if the processor gates some internal clocks. The processor is in the "C2" state if an external device drives a pin to the processor to stop internal clocks. However, in the C2 state, the processor cache may still be snooped. The "C3" state is similar to the "C2" state. In the C3 state, however, the cache may not be snooped. Finally, the processor is in the "C4" state if internal clocks are stopped and the processor voltage level is decreased. The C0, C1, C2, C3, and C4 states may be similar to or equal to the processor states defined by the Advanced Configuration and Power Interface (ACPI) specification.

Figure 1:
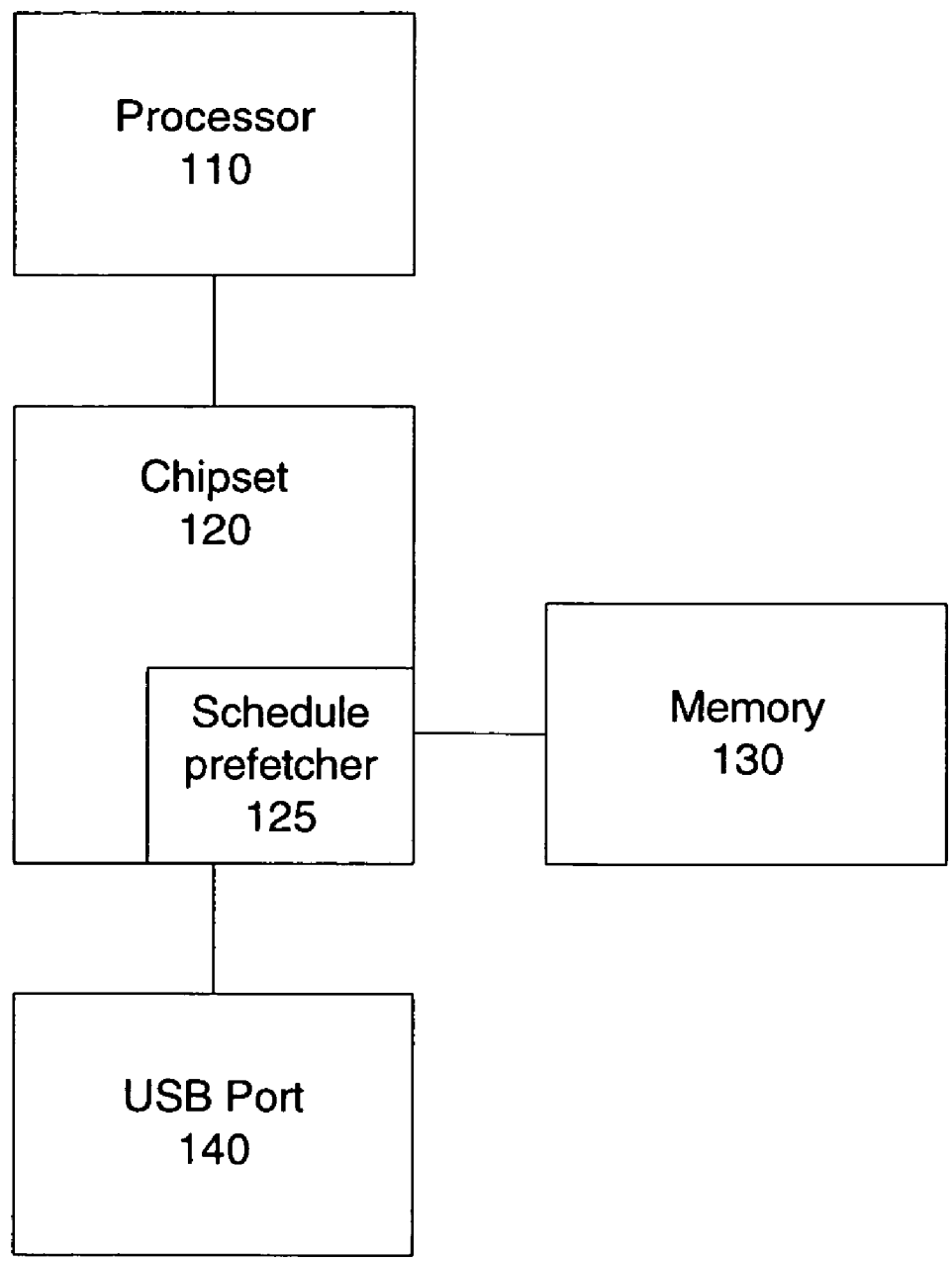
FIG. 1 is an embodiment of a computer system having a chipset that comprises a USB schedule prefetcher.

For one embodiment of the invention, FIG. 1 depicts a computer system having a chipset that comprises a USB schedule prefetcher. The computer system of FIG. 1 comprises a processor 110, a chipset 120, a memory 130, and a USB port 140. Processor 110 is coupled to chipset 120. A chipset typically comprises a plurality of controller hubs, which may be located on a plurality of integrated circuits. As a specific example, a chipset includes a memory controller hub (MCH) for communicating with at least a memory and a processor and an input/output (I/O) controller hub for communicating with input/output devices, such as USB devices. Chipset 120 has a USB schedule prefetcher 125. USB port 140 and memory 130 are coupled to chipset 120. The computer system of FIG. 1 may be compliant with USB 1.0, USB 1.1, or USB 2.0 specifications.

Software of the computer system schedules a USB periodic list. The periodic list instructs a USB host controller when to run interrupt and isochronous transfers to and from a USB port. The periodic list is stored in memory 130. Memory 130 may be Dynamic Random Access Memory (DRAM) or any other commonly used random access memory (RAM). USB data may be transferred from chipset 120 to USB port 140 in approximately 125 microsecond granular frames. For this embodiment of the invention, the schedule prefetcher 125 in chipset 120 checks for frames where the periodic list has activity scheduled. Furthermore, schedule prefetcher 125 tracks the frames where USB activities are scheduled. Memory 130 is subsequently accessed by a periodic DMA engine during frames having scheduled USB activities. The periodic DMA engine will be discussed in more detail in reference to FIG. 2. Thus, during predetermined periods of USB inactivity, processor 110's cache need not be snooped; allowing processor 110 to be placed in a C3, C4, or other power management state.

Figure 2:
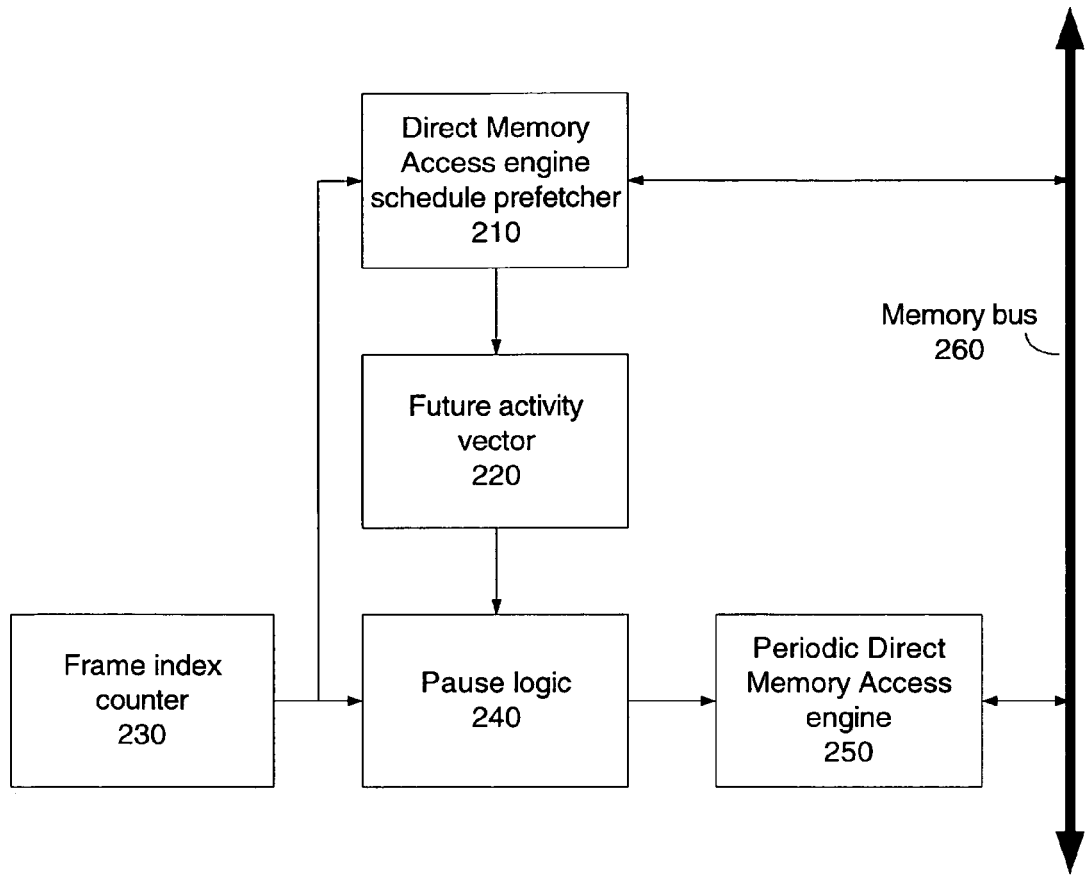
FIG. 2 is an embodiment of a circuit for monitoring and storing frames having scheduled USB activities.

FIG. 2 is an embodiment of a circuit for monitoring and storing frames having scheduled USB activities. FIG. 2 comprises a schedule prefetcher 210, a future activity vector 220, a frame index counter 230, a pause logic 240, a periodic DMA engine 250, and a memory bus 260. Schedule prefetcher 210 may be a direct memory access (DMA) engine schedule prefetcher. Schedule prefetcher 210 is coupled to future activity vector 220, frame index counter 230, and memory bus 260. Future activity vector 220 is coupled to pause logic 240. Pause logic 240 is coupled to periodic DMA engine 250. Periodic DMA engine 250 is coupled to memory bus 260. For one embodiment of the invention, schedule prefetcher 210, future activity vector 220, frame index counter 230, pause logic 240, and periodic DMA engine 250 may be part of a chipset.

Schedule prefetcher 210 may access structures in memory via memory bus 260. The memory bus 260 may be coupled to a dynamic random access memory (DRAM). Schedule prefetcher 210 may read the structures and check for scheduled activity in frames, the frames being pointed to by a software generated periodic list with USB scheduled activities. Schedule prefetcher 210 may then mark frames having USB activities scheduled as "active" and frames not having USB activities schedules as "not active." Schedule prefetcher 210 may store the results in the future activity vector 220. The results may be stored as bits, such as activity bits that represent whether activity for a corresponding frame is scheduled (active) or not scheduled (inactive/not active).

For example, each bit represents a 125 microsecond granular frame. Schedule prefetcher 210, if a frame has USB activity scheduled, sets a corresponding bit in the future activity vector 220. Similarly, schedule prefetcher 210, if the frame has no USB activity scheduled, clears the corresponding bit in future activity vector 220. Future activity vector 220 may be a circular first in first out (FIFO) structure having associated pointers to track storage locations in the FIFO structure.

Frame index counter 230 tracks the frames accessed-by periodic DMA engine 250. Frame index counter 230 may advance, or retard based on the design, the frame index approximately every 125 microseconds. Pause logic 240 reads the frame data from future activity vector 220 as the frame index counter 230 advances the frame index. The activity bit associated with the current frame index is used to determine whether or not to disable/pause the periodic DMA engine 250 for that frame.

Pause logic 240 pauses the data communication to the periodic DMA engine whenever the current frame's activity bit is cleared. As a result, the periodic DMA engine 250 may access memory only during frames where USB traffic is scheduled. By creating long enough idle times on a processor and memory, in the presence of connected, but inactive USB devices, the processor may enter a C3, a C4, or other power management state. As a specific example, if an activity bit within future activity vector 220 is set/cleared to represent no scheduled activity for the current frame by schedule prefetcher 210, then pause logic 240 disables/ pauses periodic DMA engine 250. Therefore, periodic DMA engine 250 does not access memory and potentially cause a cache snoop that would disallow processor 110 from entering a low power state.

Schedule prefetcher 210 opportunistically refills future activity vector 220 while the processor and memory are busy anyway. As an example, prefetcher 210 accesses system memory and refills the future activity vector 220 in bursts during times when the system memory is in use anyway, thereby allowing long periods of idle time on the memory and cache interfaces.

Figure 3A:
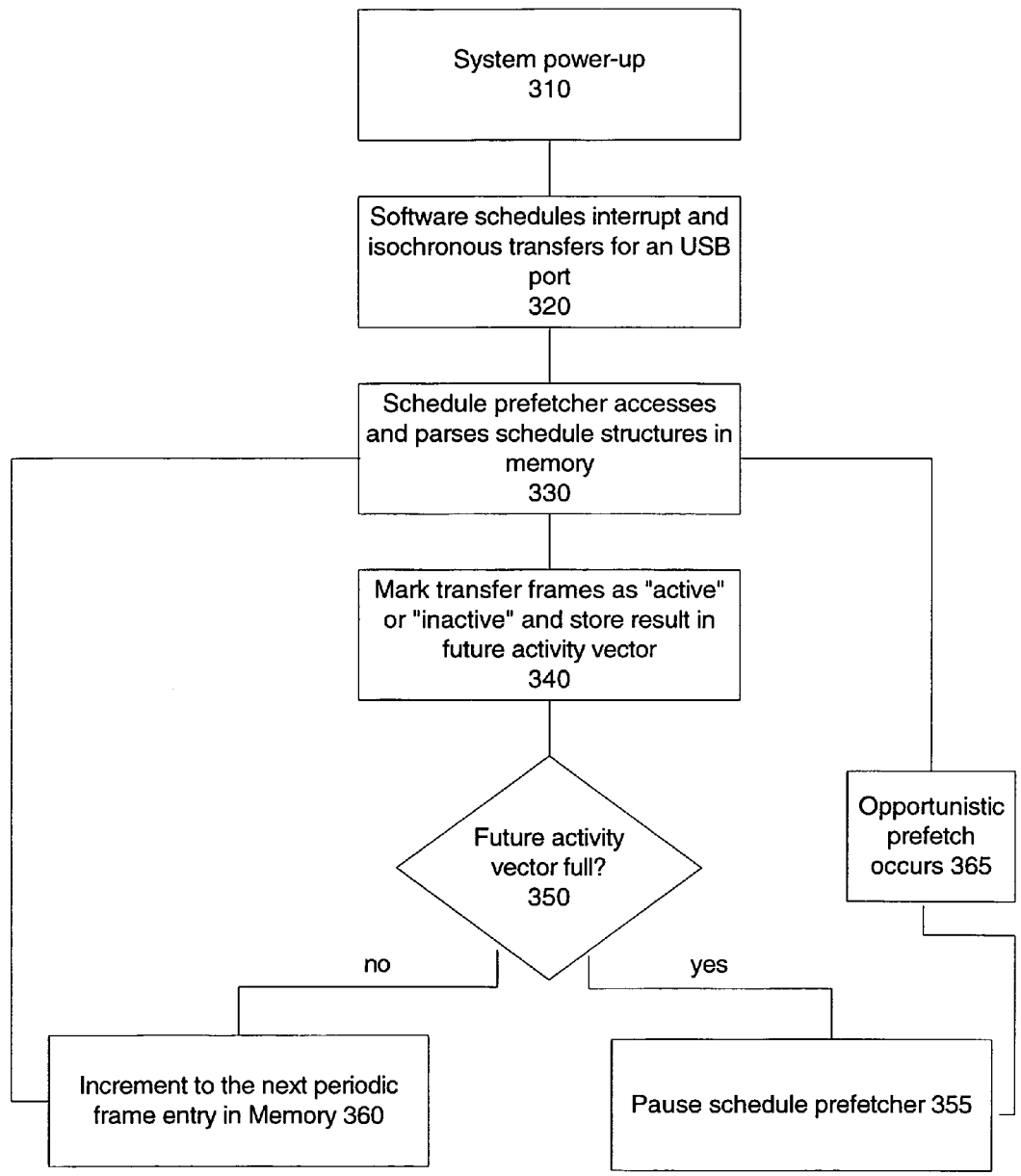
FIG. 3a is an embodiment of a flowchart for a prefetch engine filling a future activity vector.

FIG. 3a is an embodiment of a flowchart for a schedule prefetcher filling a future activity vector. The system is powered-up in operation 310. An operating system may schedule interrupt and isochronous transfers for a USB port in operation 320. The USB transfers may be scheduled in approximately 125 microsecond granular frames and stored in main memory. Next, a schedule prefetcher may access and parse the USB periodic linked list schedule structures in main memory in operation 330. The transfer frames are marked as "active" or "inactive" in operation 340, based on whether activity is scheduled in the structures of the linked list. The results are then stored in a future activity vector. If the future activity vector is full then schedule prefetcher is paused in operation 355. However, if the future activity vector is not full, then the frame index counter advances, as normal, and the schedule prefetcher accesses and parses the next frame in memory. Once an opportunistic prefetch occurs in operation 365 or the future activity vector is no longer full, schedule prefetcher accesses and parses the next structure in memory, returning to operation 330.

Figure 3B:
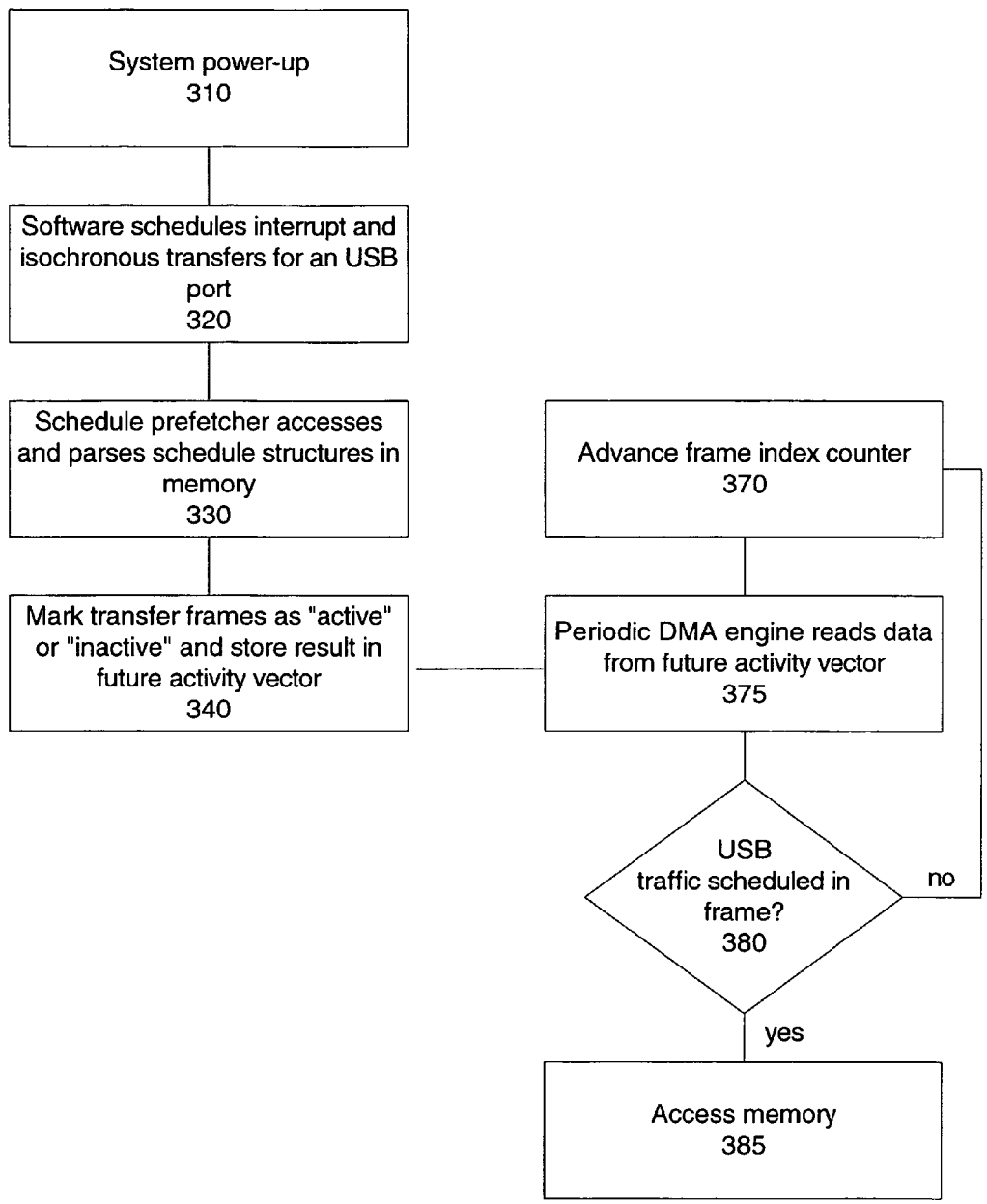
FIG. 3b is an embodiment of a flowchart of a periodic direct memory access (DMA) engine accessing memory.

Turning to FIG. 3b, an embodiment of a flowchart of a periodic direct memory access (DMA) engine accessing memory is shown. Just as in FIG. 3, the system powers up in operation 310, software schedules interrupt and isochronous transfers for a USB port in operation 320, and schedule prefetcher accesses and parses schedule structures in memory. Furthermore, in operation 340, the schedule prefetcher marks frames as "active: or "inactive" based on the parsing of structures in memory.

Once frame index counter is advanced in operation 370, which occurs approximately every 125 microseconds, data is read from the future activity vector by the periodic DMA engine in operation 375. If there is not USB traffic scheduled in the frame, as represented by the future activity vector, the frame index counter is advanced again in a return to operation 370 without the periodic DMA engine accessing memory. In contrast, if activity is scheduled in the frame, as represented by the future activity vector, memory is accessed in operation 385. The ability to not access memory in a frame where no activity is scheduled enables a processor to be placed in a low power mode, because unnecessary memory accesses and cache snoops are not committed.

Figure 4:
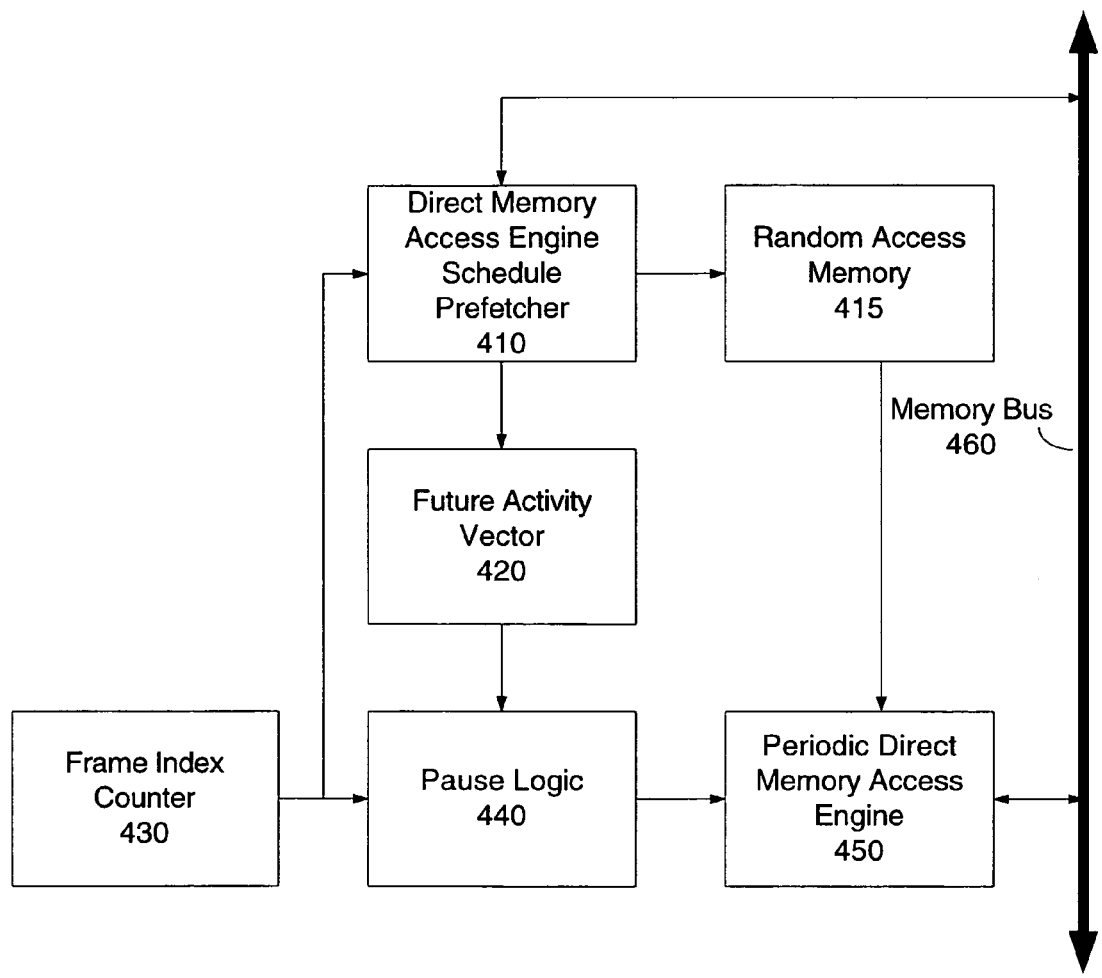
FIG. 4 is another embodiment of a circuit for monitoring and storing frames having scheduled USB activities.

FIG. 4 depicts another embodiment of a circuit for monitoring and storing frames having scheduled USB activities. This embodiment of the invention comprises schedule prefetcher 410, random access memory 415, future activity vector 420, frame index counter 430, pause logic 440, periodic DMA engine 450, and memory bus 460. Schedule prefetcher 410 is coupled to random access memory 415, memory bus 460, future activity vector 420, and frame index counter 430. Future activity vector 430 is further coupled to pause logic 440. Pause logic 440 is coupled to frame index counter 430 and periodic DMA engine 450.

DMA engine schedule prefetcher 410 may access structures in memory via memory bus 460. Memory bus 460 may be coupled to a DRAM. DMA engine schedule prefetcher 410 may read the structures and check for frames where a software generated periodic list has USB activities scheduled. DMA engine schedule prefetcher 410 may then mark frames having USB activities scheduled as "active" and frames not having USB activities schedules as "not active." DMA engine schedule prefetcher 410 may store the results in future activity vector 420. DMA engine schedule prefetcher 410 may set a bit in future activity vector 420, if a frame is marked active. Similarly, DMA engine schedule prefetcher 410 may clear a bit in future activity vector 420, if a frame is marked not active. Future activity vector 420 may be a circular first in first out (FIFO) structure having associated pointers to track storage locations in the FIFO structure.

In addition to storing active and inactive bits in future activity vector 420, identified active control structures may be stored in random access memory 415.

The frame index counter 430 tracks the current frame for Periodic DMA Engine 450 and its associated Pause Logic 440. The frame index information is also passed to Schedule Prefetcher 410 in order to update Future Activity FIFO 420 before it is needed. Frame index counter 430 may advance the frame index approximately 125 microseconds at a time. Pause logic 440 reads the frame data from future activity vector 420, as frame index counter 430 advances the frame index. The data is passed from pause logic 440 to periodic DMA engine 450. However, pause logic 440 may pause the data communication to periodic DMA engine 450 whenever the current frame's activity bit is cleared. As a result, periodic DMA engine 450 may access memory during frames where USB traffic is scheduled. However, DMA engine 450 may read active control structures from random access memory 415 rather then re-reading the structures through memory bus 460. By creating long enough idle times on a processor and memory complex in the presence of connected, but inactive USB devices, the processor may enter a C3 a C4, or other power management state.

If DMA engine schedule prefetcher 410 fills future activity vector 420, pause logic 420 may pause schedule prefetcher 355. Alternatively, if future activity vector 420 is not full, DMA engine schedule prefetcher accesses and parses the next frame in memory 415.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A computer system, comprising:
   a processor capable of entering a plurality of power states; and
   a chipset coupled to the processor comprising
      a direct memory access (DMA) schedule prefetcher to determine a first plurality of scheduled inactive Universal Serial Bus (USB) frames from a data structure in a memory and
      pause logic coupled to the DMA schedule prefetcher and to a DMA engine to disable communication of the DMA engine during the first plurality of scheduled inactive USB frames.

2. The computer system of claim 1, wherein the chipset further comprises a future activity vector coupled to the DMA schedule prefetcher and the pause logic, and wherein the schedule prefetcher is to mark a plurality of fields in the future activity vector corresponding to the plurality of scheduled inactive USB frames as inactive.

3. The computer system of claim 2, wherein the schedule prefetcher is also to determine a second plurality of scheduled active USB frames from the data structure in the memory and to mark a second plurality of fields in the future activity vector corresponding to the second plurality of scheduled active frames as active.

4. The computer system of claim 3, wherein the schedule prefetcher opportunistically determines the first plurality of scheduled inactive frames and the second plurality of scheduled active frames.

5. The computer system of claim 4, wherein the processor is placed in a low power mode if the memory is not accessed for a predefined period of time.

6. The computer system of claim 5, wherein the predefined period of time is approximately one millisecond.

7. The computer system of claim 5, wherein the low power mode is a C3 power management state.

8. The computer system of claim 5, wherein the low power mode is a C4 power management state.

9. The computer system of claim 1, wherein the memory is a Dynamic Random Access Memory (DRAM).

10. The computer system of claim 1, wherein the computer system is USB 2.0 compliant.

11. An apparatus, comprising:
    a future activity vector including a plurality of fields, each of the plurality of fields corresponding to a plurality of Universal Serial Bus (USB) frames;
    a direct memory access (DMA) engine schedule prefetcher coupled to the future activity vector to determine from a data structure in a first memory that a first future USB frame of the plurality of USB frames does not include scheduled activities, wherein the DMA engine schedule prefetcher is to mark a first field of the plurality of fields that corresponds to the first future USB frame as inactive in response to determining the first USB frame does not include scheduled activities; and
    a periodic DMA engine coupled to the future activity vector to suspend communication during the first future USB frame based on the first field being marked inactive.

12. The apparatus of claim 11, further comprising:
    a frame index counter coupled to the DMA engine schedule prefetcher and to the periodic DMA engine to increment a frame index, the frame index to reference a current USB frame of the plurality of USB frames.

13. The apparatus of claim 12, further comprising: pause logic coupled between the future activity vector and the periodic DMA engine, wherein in response to the frame index referencing the first future USB frame as the current USB frame, the pause logic is to disable the periodic DMA engine to suspend communication based on first field being marked as inactive in the future activity vector.

14. The apparatus of claim 13, wherein the first field includes a first frame activity bit, and wherein the DMA engine schedule prefetcher to mark the first field as inactive comprises clearing the first frame activity bit.

15. The apparatus of claim 11, further comprising:
    a second memory coupled to the DMA engine schedule prefetcher and the periodic DMA engine to store a copy of USB data read by the DMA engine schedule prefetcher from the first memory.

16. An apparatus comprising:
    a DMA schedule prefetcher to determine if universal serial bus (USB) activity is scheduled for a first USB frame and fill a first field, which corresponds to a first frame, in a future activity vector coupled to the DMA schedule prefetcher, with a first value, in response to determining USB activity is scheduled for the first frame and a second value, in response to no USB activity being scheduled for the first frame; pause logic coupled to the future activity vector and the DMA schedule prefetcher to pause the DMA schedule prefetcher, in response to future activity vector being full; and wherein the pause logic, in response to the first frame being referenced by frame index logic as the current frame, is also to cause a periodic DMA engine, if the first field is filled with the second value.

17. The apparatus of claim 16, wherein a schedule prefetcher to fill a first field in the future activity vector with the first value comprises the schedule prefetcher to set a first bit in the first field to a first logical value.

18. The apparatus of claim 17, wherein a schedule prefetcher to fill
    a first field in the future activity vector with the second value comprises the schedule prefetcher to clear the first bit in the first field to a second logical value.

19. The apparatus of claim 16, wherein a schedule prefetcher to determine if USB activity is schedule for a first USB frame comprises: the schedule prefetcher to opportunistically access a data structure in a first memory including a reference to a scheduled activity level of the first USB frame, wherein it is determined that USB activity is scheduled for the first USB frame in response to the reference to the scheduled activity level of the first USB frame indicating scheduled activity in the first frame and it is determined that no USB activity is scheduled for the first frame in response to the reference to the scheduled activity level of the first USB frame indicating no scheduled activity for the first frame.

20. A method, comprising:
opportunistically periodically reading a schedule structure from a main memory;
determining a first number of frames that have Universal Serial Bus (USB) activity scheduled from the schedule structure;
determining a second number of frames that do not have USB activity scheduled from the schedule structure; and
pausing accesses to the main memory by a Direct Memory Access (DMA) engine during the second number of frames based on determining the second number of frames do not have USB activity scheduled.

21. The method of claim 20, further comprising:
marking a first number of fields in an activity memory as "active", the first number of fields corresponding to the first number of frames; and
marking a second number of fields in the activity memory as "inactive", the second number of fields corresponding to the second number of frames.

22. The method of claim 20, wherein opportunistically periodically reading a linked list schedule structure from a main memory comprises reading the linked list schedule structure in bursts during times when the main memory is active.

23. The method of claim 22, further comprising: performing accesses to the main memory with the (DMA) engine during the first number of frames.

24. The method of claim 23, wherein the schedule structure includes a linked list schedule structure.

25. The method of claim 21, further comprising:
determining a current frame from a frame index counter;
determining if a current field in the activity memory, which corresponds to the current frame, is one of the first number of fields marked as active;
performing an access with the DMA engine to the main memory during the current frame in response to determining the current field is one of the first number of fields marked as active;
determining if the current field is one of the second number of fields marked as inactive;
pausing accesses to the main memory by the DMA engine during the current frame, in response to determining the current field is one of the second number of fields marked as inactive.

26. The method of claim 25, further comprising: incrementing the frame index counter at the expiration of an amount of time defining a USB frame.

* * * * *